(12) United States Patent
Cavalli

(10) Patent No.: US 6,839,834 B2
(45) Date of Patent: Jan. 4, 2005

(54) MICROPROCESSOR PROTECTED AGAINST PARASITIC INTERRUPT SIGNALS

(75) Inventor: Didier Cavalli, Grenoble (FR)

(73) Assignee: STMicroelectronics SA, Montrouge (FR)

(*) Notice: Subject to any disclaimer, the term of this patent is extended or adjusted under 35 U.S.C. 154(b) by 661 days.

(21) Appl. No.: 09/826,427

(22) Filed: Apr. 3, 2001

(65) Prior Publication Data

US 2002/0144182 A1 Oct. 3, 2002

(51) Int. Cl.[7] .................................................. H04L 1/22
(52) U.S. Cl. ....................................................... 712/244
(58) Field of Search ................................. 712/228, 244; 714/34

(56) References Cited

U.S. PATENT DOCUMENTS 4,484,271 A * 11/1984 Miu et al. ................... 712/244
5,822,595 A * 10/1998 Hu .............................. 710/264
6,708,241 B1 * 3/2004 Futral ......................... 710/260

OTHER PUBLICATIONS

Short, Embedded Microprocessor System Design: An Introduction Using the Intel 80C188EB, 1998, Prentice–Hall, Inc., pp. 219–224, 467–470.*

* cited by examiner

Primary Examiner—Eddie Chan
Assistant Examiner—Barry O'Brien
(74) Attorney, Agent, or Firm—Lisa K. Jorgenson; Allen, Dyer, Doppelt, Milbrath & Gilchrist, P.A.

(57) ABSTRACT

A microprocessor is for detecting an interrupt request during execution of a program, saving contextual data elements of the program being executed, sending an interrupt acknowledge signal, and jumping to an interrupt subroutine if the interrupt request is still present after saving the contextual data. Otherwise, the microprocessor resumes execution of the interrupted program.

20 Claims, 3 Drawing Sheets

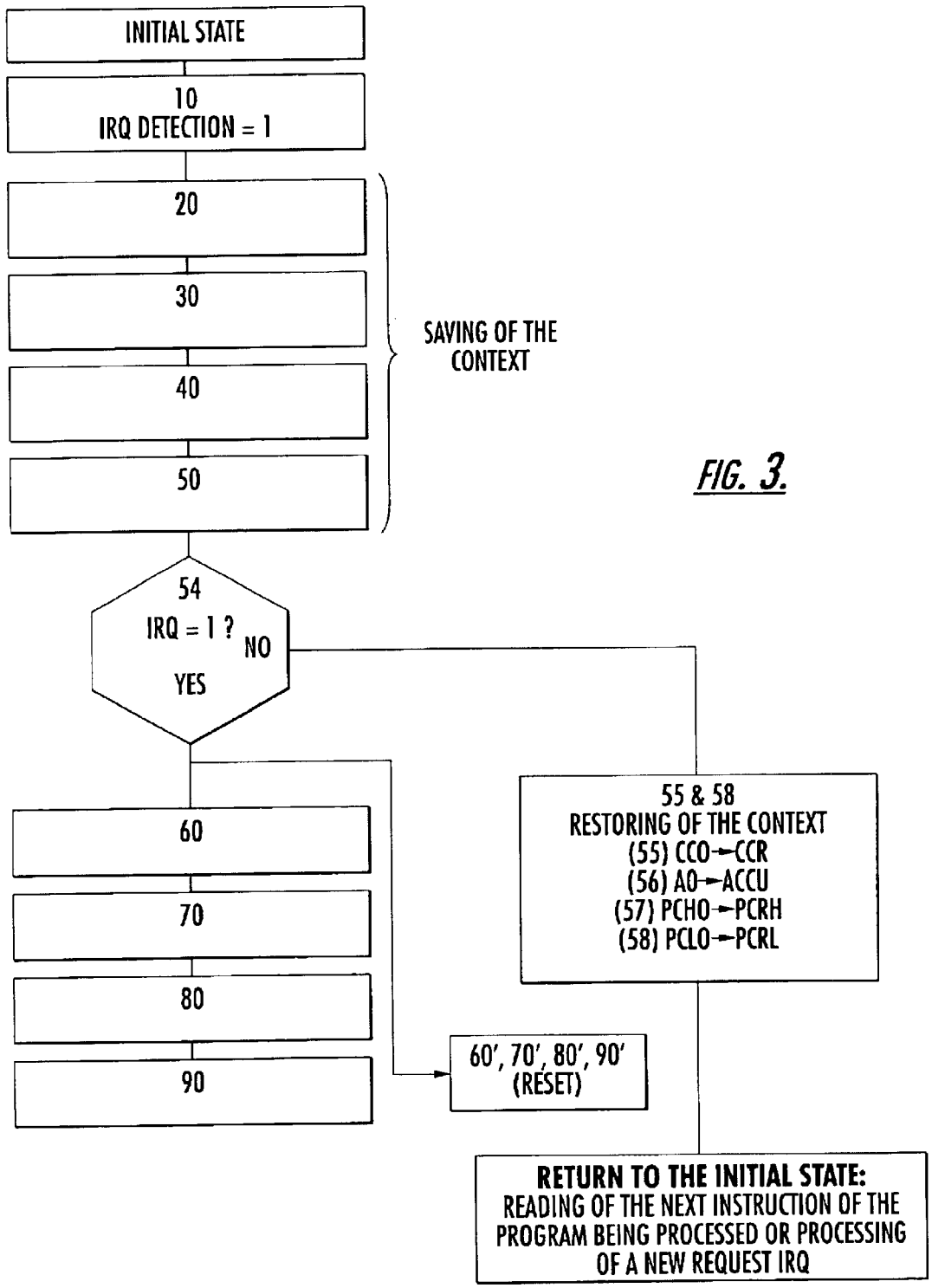

MICROPROCESSOR PROTECTED AGAINST PARASITIC INTERRUPT SIGNALS

FIELD OF THE INVENTION

The present invention relates to electronic circuits, and, more particularly, to microprocessors.

BACKGROUND OF THE INVENTION

A microprocessor may be designed to interrupt the execution of a program and switch to a subroutine upon receiving an interrupt signal. This makes it possible to nearly instantaneously process asynchronous events. Such a microprocessor is therefore capable of receiving various interrupt signals from peripherals internal or external to the microprocessor. The internal peripherals are generally communications peripherals that prompt an interrupt of a program for the priority processing of a specified task.

In practice, several interrupt signals may be applied simultaneously (i.e., in parallel) to a microprocessor. An interrupt controller manages priorities of the interrupt requests. The interrupt controller first processes the interrupt with the highest priority according to a hierarchy of predetermined priorities. The interrupt controller also manages an interrupt vector for switching the microprocessor to an interrupt subroutine corresponding to the interrupt signal to be processed.

The implementation of an interrupt mechanism within a microprocessor requires some precautions. This is because a certain period of time elapses between the instant at which the core of a microprocessor detects an interrupt request and the instant at which it processes this request. The withdrawal of an interrupt request between these two instants may cause the microprocessor to malfunction for reasons that will be understood more clearly with reference to FIG. 1.

A diagrammatic view of an exemplary architecture of a microprocessor MP including an interrupt circuit or means is shown in FIG. 1. The microprocessor is of the microcontroller type and includes a central processing unit CPU, an interrupt controller ITC, and a memory array that are integrated on the same silicon chip. In this example, the unit CPU is connected to the memory array by a 16-bit address bus ADB and an 8-bit data bus DTB. The memory array includes a program memory PMEM which may include, for example, an electrically erasable and programmable FLASH memory and a random-access data memory (RAM) DMEM.

The CPU includes a core CORE and registers, among which there is a program counter register PCR, an accumulator register ACCU, a condition code register CCR (including flags of the microprocessor), and a stack pointer register SP. Since the illustrated microprocessor operates based upon 8 data bits and 16 address bits, the register PCR includes a most significant bit register PCRH and a least significant bit register PCRL. The registers PCRH, PCRL respectively include the 8 most significant address bits and the 8 least significant address bits of the address of the instruction being executed. Similarly, the register SPR includes a register SPRH and a register SPRL respectively including the 8 most significant bits and the 8 least significant bits of the address of the top of the stack STK.

The stack STK is a reserved zone of the random-access memory DMEM used to save a "context" during the jump to a subroutine or during the execution of PUSH or POP type instructions (corresponding to the stacking or unstacking of data in the stack). The context represents a set of data present in the registers of the CPU whose values depend on the program being executed. In this case, the context is the contents of the registers PCRH, PCRL, ACCU, CCR.

The interrupt controller ITC is a wired logic decoder equipped with N inputs to receive N interrupt signals IT1 to $IT_N$. When a peripheral element applies an interrupt signal ITx to the microprocessor, the signal ITx is received by one of the inputs IT1 to $IT_N$ of the controller ITC. The controller ITC then delivers an interrupt request IRQ and an interrupt vector ITVECx to the core of the CPU. When the CPU detects the request IRQ, it terminates execution of the instruction in progress, increments the program counter PC, and then processes the interrupt. This processing conventionally includes saving the context in the stack STK, sending an interrupt acknowledge signal ITACK and determining the address the interrupt subroutine using the interrupt vector ITVECx, and reading and executing the first instruction of the subroutine and then of the following instructions. After execution of the interrupt subroutine, the microprocessor restores the context saved in the stack and resumes execution of the program (unless a new interrupt request IRQ sends switches the microprocessor to a new interrupt subroutine).

As noted above, there is a risk that the peripheral that sent the interrupt signal ITx will withdraw this signal before the core of the CPU has time to determine the address of the interrupt subroutine using the interrupt vector ITVECx. To resolve this problem, two precautions are generally taken. First, it is recommended in the data sheets of microprocessors that an interrupt should be held until the acknowledgment ITACK is sent. Second, should the suggestion in the data sheet not be complied with by a peripheral, the controller ITC is designed to deliver a default interrupt vector $ITVEC_{RST}$ that routes the CPU to an address in which there is a resetting instruction RST. Accordingly, if a peripheral withdraws the interrupt signal ITx before the CPU has time to read the interrupt vector ITVECx, the default interrupt vector delivered by the controller ITC is the vector $ITVEC_{RST}$ which prompts the software resetting (pseudo-RESET) of the microprocessor.

In practice, it is also the case that electrical or electromagnetic disturbances prompt the appearance of parasitic and ephemeral interrupt signals at the inputs of the decoder ITC which give rise to untimely resettings of the microprocessor. Indeed, the CPU may detect an interrupt request IRQ but, after saving the context, it may receive the interrupt vector $ITVEC_{RST}$.

SUMMARY OF THE INVENTION

An object of the present invention is to provide a microprocessor having reduced susceptibility to parasitic interrupts. As used herein, the term "parasitic interrupt" generally designates an interrupt withdrawn by a peripheral before sending the acknowledgment ITACK or an ephemeral interrupt generated by a disturbing phenomenon.

This and other objects, features, and advantages according to the invention are provided by a method for processing an interrupt request signal using a microprocessor including a CPU, an interrupt controller, registers whose contents define a context, and a stack for saving the context. The interrupt controller provides an interrupt request and an interrupt vector to the CPU when an interrupt signal is applied to the microprocessor. The method includes detecting an interrupt signal while the CPU is in an initial state, saving the context in the stack, and verifying a presence of the interrupt request after saving the context. If the interrupt request is still present, an interrupt acknowledge signal is sent and a first instruction of an interrupt subroutine is read and executed. If the interrupt request is no longer present, the saved context is restored in the stack and the microprocessor returns to the initial state.

More specifically, reading and executing of the first instruction of an interrupt subroutine may include preliminarily reading a data element at an address determined by the interrupt vector where the data element includes a read address of the first instruction of the interrupt subroutine. The return to the initial state may include reading and executing an instruction of a program being processed during the detection of the interrupt request. Returning to the initial state may include processing a new interrupt if an interrupt request is again present at the output of the interrupt controller. Furthermore, restoring the context may include restoring the contents of a program counter register. Returning to the initial state may include the application to an address bus of the restored contents of the program counter register.

Another method aspect of the invention is for processing an interrupt request with a microprocessor during the execution of a program. The method may include detecting the interrupt request, saving contextual data of the program, sending an interrupt acknowledge signal, and jumping to an interrupt subroutine. After saving the contextual data and before jumping to the interrupt subroutine, the microprocessor may verify that the interrupt request is still present and resume execution of the interrupted program if the interrupt request is no longer present.

More specifically, saving contextual data elements may include recording, in a random-access memory, data located in registers of the microprocessor. The data elements recorded in the random-access memory may be reintroduced into their original registers before execution of the interrupted program is resumed. Further, when an interrupt request reappears after the disappearance of the initial interrupt request, resumption of execution of the program may be postponed and the new interrupt request processed.

A microprocessor according to the invention includes a CPU, an interrupt controller, registers whose contents define a context, and a stack for saving the context. The interrupt controller delivers an interrupt request and an interrupt vector to the CPU when an interrupt signal is applied to the microprocessor. The CPU executes operations after detecting an interrupt request. These operations include saving the context in the stack and verifying that the interrupt request is still present after saving of the context. Also, if the interrupt request is still present, the CPU sends an interrupt acknowledge signal and a first instruction of an interrupt subroutine is read and executed. If the interrupt request is no longer present, the CPU restores the saved context in the stack and returns to an initial state in which the microprocessor was before saving the context.

The CPU may read a data element at an address determined by the interrupt vector including the read address of the first instruction of the interrupt subroutine. The CPU may also restore the contents of a program counter register during the restoration of the context. Further, during the return to the initial state, the CPU may read and execute an instruction whose address is present in the program counter register. During the return to the initial state, the CPU may also process a new interrupt if an interrupt request is again present at the output of the interrupt controller. The microprocessor may include a 16-bit program counter register divided into two 8-bit registers and a 16-bit stack pointer register divided into two 8-bit registers.

The present invention also relates to a microprocessor which, upon the detection of an interrupt request during the execution of a program, saves contextual data elements of the program being executed, verifies that the interrupt request is still present after saving the contextual data, sends an interrupt acknowledge signal, and jumps to an interrupt subroutine if the interrupt request is still present. If not, the microprocessor resumes execution of the interrupted program.

More specifically, the microprocessor may save contextual data by storing, in a random-access memory, the data elements which are located in registers. The microprocessor may also reintroduce the contextual data elements recorded in the random-access memory into their original registers before resuming execution of the interrupted program. Further, the microprocessor may process a new interrupt request if the new interrupt request appears after detecting the disappearance of the initial interrupt request and before resumption of execution of the interrupted program.

BRIEF DESCRIPTION OF THE DRAWINGS

These and other objects, characteristics and advantages according to the present invention will become more apparent in the following description of an interrupt processing method according to the invention, given by way of non-limitative example, with reference to the appended drawings, in which:

FIG. 3 is a flow diagram illustrating a method according to the invention for processing an interrupt.

DETAILED DESCRIPTION OF THE PREFERRED EMBODIMENTS

A method according to the invention will be described by way of an example herein with reference to the simplified architecture of the microprocessor described above. This microprocessor includes the essential elements needed for an understanding of the invention. Thus, the microprocessor MP shall be considered to represent both a standard microprocessor and a microprocessor designed to implement the method according to the invention. Indeed, in practice, the structural differences between a standard microprocessor MP and a microprocessor MP designed to implement the method of the invention lie in the internal architecture of the core of the CPU, which shall not be illustrated here for practical reasons.

It may be recalled here that the architecture of a microprocessor core is presently generated automatically by computer tools or hardware compilers. This is done by using a functional description of the core made by a particular language, e.g., the VHDL language. The structural description of a microprocessor core designed to implement the method of the invention will therefore provide those skilled in the art with no useful information for the implementation of the method of the invention which, in practice, will include a modification of the program (VHDL or other) for the automatic generation of the core. This will include incorporating into this program steps according to the invention described below.

The functional characteristics that distinguish a microprocessor according to the invention from a prior art microprocessor will be discussed with reference to FIGS. 2 and 3.

Figure 2:
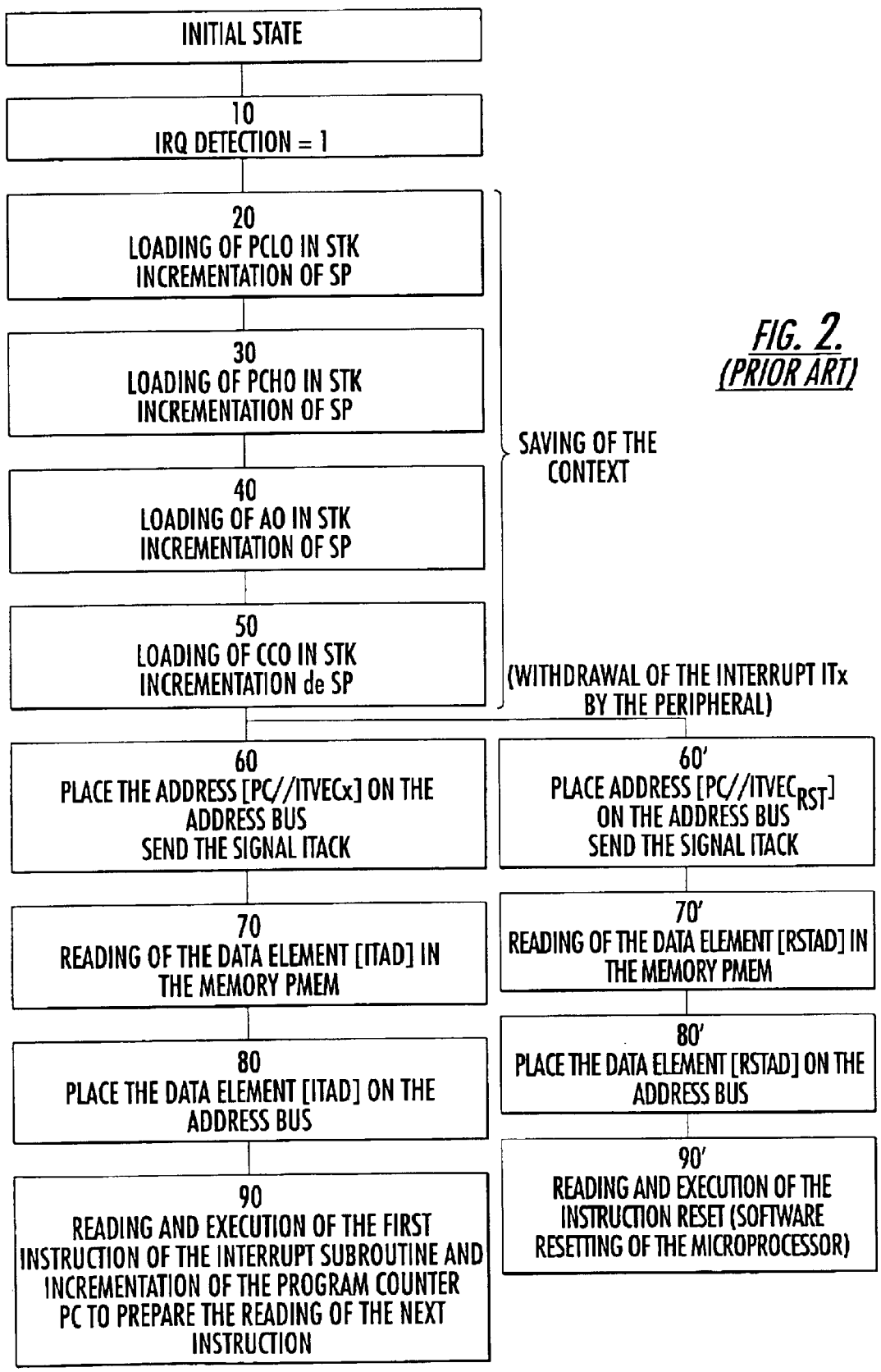
FIG. 2 is a flow diagram illustrating a standard method of processing an interrupt according to the prior art.

FIG. 2 is a flow diagram describing the main steps of a standard method of processing an interrupt, and FIG. 3 is a flow diagram describing the main steps of a method of processing an interrupt according to the invention.

The flow chart of FIG. 2, including steps 10 to 90, illustrates the standard operations performed by the CPU of the microprocessor after the application of an interrupt signal ITx to the interrupt controller ITC by a peripheral (not shown). It further illustrates sending an interrupt request IRQ and an interrupt vector ITVECx by the controller ITC. It is assumed here that the CPU is in a state called an "initial state" when the request IRQ is sent by the controller ITC. This initial stage generally corresponds to the execution of an instruction of a main program being processed, which is recorded in the memory PMEM.

Thus, at step 10, the CPU detects the interrupt signal IRQ and terminates execution of the current instruction of the main program. Execution of the current instruction includes incrementation of the program counter PC in preparation for reading the following instruction of the main program after processing the interrupt ITx. During the following steps 20, 30, 40 and 50, the CPU saves the data forming the context of the program being executed. These data elements include two bytes PCL0, PCH0 present in the registers PCRL, PCRH. These bytes define the current value PC0 of the program counter PC, one byte A0 present in the accumulator ACCU and one byte CC0 present in the register CCR.

Thus, at step 20, the CPU loads the byte PCL0 into the stack STK and increments the stack pointer SP. This operation includes incrementing the register SPRL with a carry, as the case may be, of the overflow bit into the register SPRH. At step 30, the CPU loads the byte PCH0 into the stack STK and again increments the stack pointer SP. At step 40, the CPU loads the byte A0 into the stack STK and again increments the stack pointer SP. At step 50, the CPU loads the byte CC0 into the stack STK and again increments the stack pointer SP.

During a step 60, when the context has been saved in the random-access memory DMEM, the CPU places an address [PC//ITVECx] on the address bus and sends an interrupt acknowledge signal ITACK to the peripheral which sent the interrupt signal ITx. The address [PC//ITVECx] is obtained by concatenation of the most significant bits of the program counter PC (which are held at a fixed value in interrupt mode) and of the bits forming the interrupt vector ITVECx, which may be encoded on 4 bits, for example. The peripheral may determine that the acknowledge signal pertains to the interrupt ITx that it sent by reading the vector ITVECx on the address bus.

Figure 1:
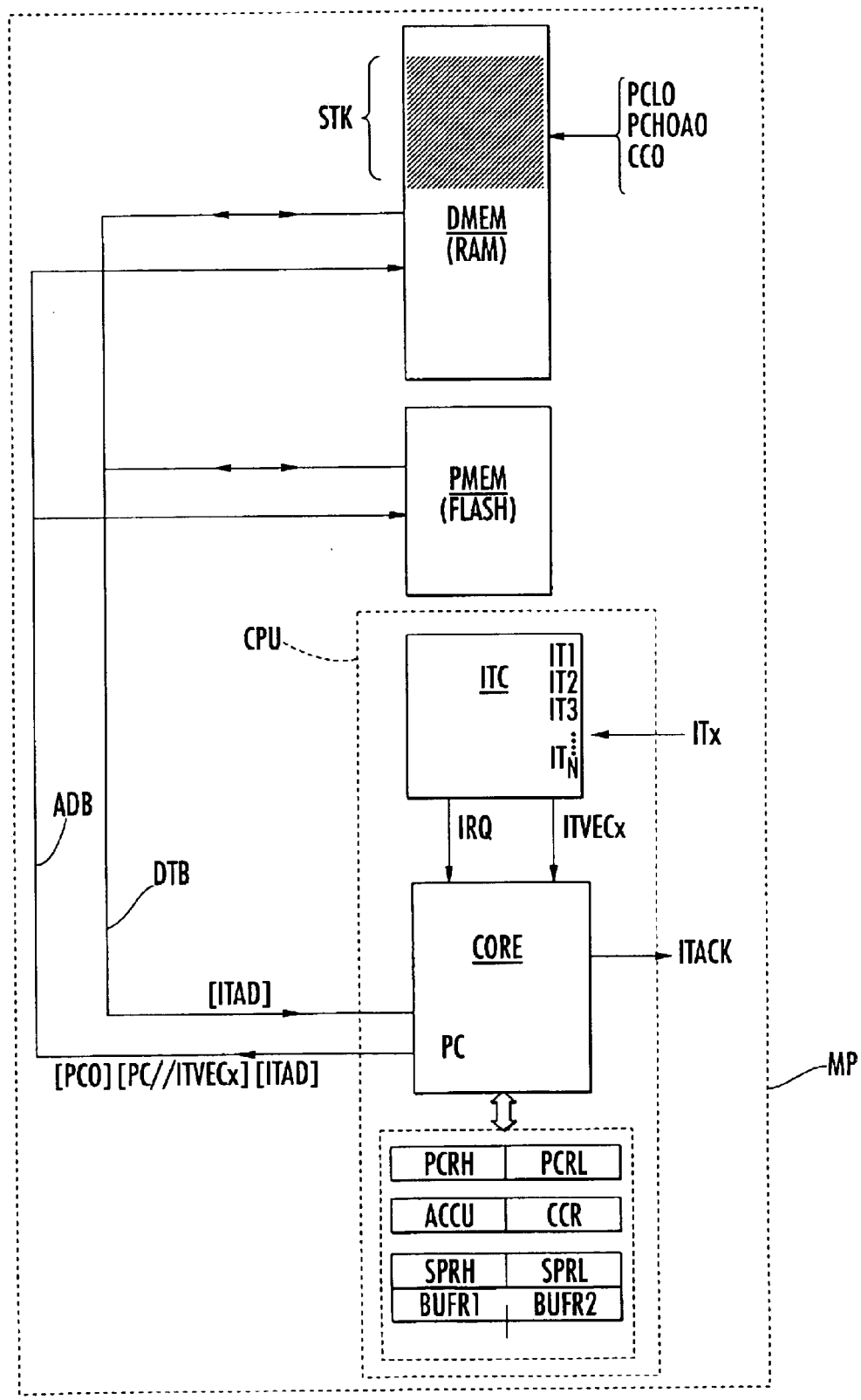
FIG. 1 shows the standard architecture of a microprocessor according to the prior art.

During a step 70, the core reads a data element [ITAD] in the memory array (memory DMEM or PMEM) at the address [PC//ITVECx]. This data element [ITAD] is a 16-bit address designating a memory location in which the first instruction of an interrupt subroutine designed to process the interrupt ITx is located. Since the microprocessor shown in FIG. 1 is a microprocessor with 8 data bits and 16 address bits, reading of the address [ITAD] is done in several substeps. These include reading of a most significant byte $[ITAD]_{MSB}$ at the address [PC//ITVECx], loading the byte $[ITAD]_{MSB}$ into a buffer register BUFR1 (shown in FIG. 1), incrementation of the program counter PC (PC=PC+1), reading a least significant byte $[ITAD]_{LSB}$ at the address [(PC//ITVECx)+1], and loading the byte $[ITAD]_{LSB}$ in a buffer register BUFR2.

During a step 80, the core places the 16-bit address [ITAD], recorded in the registers BUFR1, BUFR2, on the address bus. At step 90, the CPU reads and executes the first instruction of the interrupt subroutine at the address [ITAD] and increments the program counter PC to prepare the reading of the next instruction of the interrupt subroutine. During the following steps (not shown in FIG. 2) the microprocessor performs the subroutine, restores the context saved in the stack STK, and resumes execution of the main program at the address PC0 restored in the register PCR (PCRH and PCRL).

As noted above, the drawback of this standard method becomes apparent in the event of the disappearance of the interrupt signal before the execution of step 60. Indeed, if the interrupt signal ITx is no longer present at the input of the interrupt controller ITC when the CPU determines the address [PC//ITVECx], the controller ITC delivers a default resetting vector $ITVEC_{RST}$. In this case, the CPU executes steps 60', 70', 80', 90'. These steps are equivalent to steps 60, 80, 80, 90 but are based on a different interrupt vector and route the CPU toward an address where the resetting instruction RST is located. The instruction RST is executed at step 90' and prompts the software for resetting the microprocessor.

The method according to the invention shown in FIG. 3 does not have this drawback. The method according to the invention includes the standard steps 10, 20, 30, 40 and 50 that have just been described, i.e., in which the CPU detects the request IRQ and saves the context. According to the invention, the CPU is designed to perform a test step 54 after the standard step 50. In this test step 54, the microprocessor determines that the request IRQ is still present at the output of the controller ITC (IRQ=1).

If the request IRQ is still present, the CPU processes the interrupt by executing the standard steps 60, 70, 80, 90 described above. The working of a microprocessor according to the invention is therefore identical to that of a standard microprocessor when the interrupt ITx is held until sending of the acknowledgment signal ITACK.

Yet, on the contrary, if the request IRQ is no longer present then the interrupt vector delivered by the controller ITC is no longer valid and the default interrupt vector is $ITVEC_{RST}$. The CPU then executes the steps 55 to 58 by which it can return to the initial stage to continue execution of the interrupted program. Thus, the CPU replaces the byte CC0 in the register CCR and decrements the stack pointer SP by one unit (step 55). In step 56, the CPU replaces the byte A0 in the accumulator ACCU and decrements the stack pointer SP by one unit. In step 57, the CPU replaces the byte PCH0 in the register PCRH and decrements the stack pointer SP by one unit. The CPU then returns to the initial state to execute the following instruction of the interrupted program, whose address PC0 (PCH0//PCL0) has been restored in the program counter register PCR.

Naturally, returning to the initial state may also include processing a new interrupt if a new interrupt signal ITx has been applied to the controller ITC during the execution of the steps 55 to 58. In this case, the CPU again executes the steps 10 to 50 and the steps that follow.

Further, the method according to the invention is also capable of having various alternative embodiments. In general, the method of the invention may be applied to any type of microprocessor by implementing the steps 54 to 58 during the design of a CPU core. As discussed above, implementation of the steps 54 to 58 will in practice include formulation of these steps in the hardware compilation language (e.g., VHDL) used to generate the architecture of the core. Additionally, the verification step 54 may be implicit in the operation of the CPU which can pass directly from step 50 to step 60 or to step 55 depending on the logic value of the signal IRQ.

That which is claimed is:

1. A method for processing an interrupt signal using a microprocessor comprising a central processing unit (CPU), an interrupt controller providing an interrupt request to the CPU when the interrupt signal is received by the microprocessor, registers having a context stored therein corresponding to a program being executed by the CPU, and a stack for storing the context while an interrupt is being executed, the method comprising:

detecting a receipt of the interrupt request signal by the CPU from the interrupt controller;

storing the context from the registers to the stack;

verifying that the same interrupt request is still provided to the CPU from the interrupt controller after storing the context to the stack;

sending an interrupt acknowledge signal and reading and executing a first instruction of an interrupt subroutine using the CPU if the same interrupt request is still provided to the CPU; and restoring the stored context from the stack to the registers and returning the CPU to an initial state if the same interrupt request is not still provided to the CPU.

2. The method according to claim 1 wherein reading and executing the first instruction of the interrupt subroutine comprises reading a data element from an address determined based upon an interrupt vector provided by the interrupt controller, the data element comprising a read address of the first instruction of the interrupt subroutine.

3. The method according to claim 1 wherein returning the CPU to the initial state comprises reading and executing an instruction of the program being executed by the CPU when the interrupt request was detected.

4. The method according to claim 1 wherein returning the CPU to the initial state comprises processing a new interrupt if a new interrupt request is provided by the interrupt controller.

5. The method according to claim 1 wherein restoring the stored context from the stack comprises restoring contents of a program counter register.

6. The method according to claim 5 wherein returning the CPU to the initial state comprises providing the restored contents of the program counter register to an address bus.

7. A method for processing an interrupt request using a microprocessor executing a program, the method comprising:

detecting the interrupt request;

storing contextual data of the program;

verifying that the same interrupt request is still present after storing the contextual data;

resuming execution of the program if the presence of the same interrupt request is not verified; and sending an interrupt acknowledge signal and switching to an interrupt subroutine if the presence of the same interrupt request is verified.

8. The method according to claim 7 wherein storing contextual data comprises storing data located in registers of the microprocessor in a random-access memory.

9. The method according to claim 8 wherein the data stored in the random-access memory are stored into respective original registers before resuming execution of the program.

10. The method according to claim 9 wherein resuming execution of the program is postponed if a new interrupt is detected after the presence of the same interrupt request is not verified; and further comprising processing the new interrupt request.

11. A microprocessor comprising:

registers having a context stored therein;

a stack for storing the context;

an interrupt controller for providing an interrupt request and an interrupt vector when an interrupt signal is applied to the microprocessor; and a CPU for receiving the interrupt request and the interrupt vector and, upon detection of the interrupt request storing the context in said stack, verifying that the same interrupt request is still present after storing the context, sending an interrupt acknowledge signal and reading and executing a first instruction of an interrupt subroutine if the presence of the same interrupt request is verified, and restoring the stored context from said stack and returning the microprocessor to an initial state if the presence of the same interrupt request is not verified.

12. The microprocessor according to claim 11 wherein said CPU reads a data element from an address determined based upon the interrupt vector, the data element comprising a read address of the first instruction of the interrupt subroutine.

13. The microprocessor according to claim 11 further comprising a program counter register; and wherein said CPU restores contents of said program counter register during restoring of the stored context.

14. The microprocessor according to claim 13 wherein during returning the microprocessor to the initial state said CPU reads and executes an instruction corresponding to an address in said program counter register.

15. The microprocessor according to claim 11 wherein during returning the microprocessor to an initial state said CPU processes a new interrupt if a new interrupt request is provided by said interrupt controller.

16. The microprocessor according to claim 11 further comprising:

a 16-bit program counter register comprising two 8-bit registers; and a 16-bit stack pointer register comprising two 8-bit registers.

17. A microprocessor comprising:

at least one memory; and a central processing unit (CPU) for detecting an interrupt request during execution of a program, storing contextual data of the program being executed, in said at least one memory, sending an interrupt acknowledge signal and switching to an interrupt subroutine if the same interrupt request is still present after storing the contextual data, and resuming execution of the program if the same interrupt request is not still present after storing the contextual data.

18. The microprocessor according to claim 17 wherein said at least one memory comprises a random-access memory and registers for storing data elements; and wherein said CPU stores the contextual data by storing the data elements in said random-access memory.

19. The microprocessor according to claim 18 wherein said CPU stores the data elements stored in the random-access memory in respective original registers thereof before resuming execution of the program.

20. The microprocessor according to claim 17 wherein said CPU processes a new interrupt request if the new same interrupt request is present and the same interrupt request is not present and before resuming execution of the program.

* * * * *

UNITED STATES PATENT AND TRADEMARK OFFICE
CERTIFICATE OF CORRECTION

PATENT NO. : 6,839,834 B2
DATED : January 4, 2005
INVENTOR(S) : Cavalli

It is certified that error appears in the above-identified patent and that said Letters Patent is hereby corrected as shown below:

<u>Column 8,</u>
Line 43, delete "executed, in said" insert -- executed in said --
Line 64, delete "present and before" insert -- present before --

Signed and Sealed this

Seventh Day of June, 2005

JON W. DUDAS
*Director of the United States Patent and Trademark Office*